US009466056B2

(12) United States Patent
Adams et al.

(10) Patent No.: US 9,466,056 B2
(45) Date of Patent: Oct. 11, 2016

(54) CONTENT ITEM DELIVERY FOR PAYMENT

(71) Applicant: Dropbox, Inc., San Francisco, CA (US)

(72) Inventors: John Adams, San Francisco, CA (US); Aditi Jain, San Francisco, CA (US); Matteus Pan, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/331,735

(22) Filed: Jul. 15, 2014

(65) Prior Publication Data

US 2016/0019521 A1    Jan. 21, 2016

(51) Int. Cl.
*G06K 5/00* (2006.01)
*G06Q 20/22* (2012.01)
*G06Q 20/40* (2012.01)
*G06F 17/30* (2006.01)

(52) U.S. Cl.
CPC ....... *G06Q 20/223* (2013.01); *G06F 17/30882* (2013.01); *G06Q 20/40* (2013.01)

(58) Field of Classification Search
USPC .............. 235/380, 382; 705/14.51, 14.56, 44
See application file for complete search history.

(56) References Cited

U.S. PATENT DOCUMENTS

| | | | |
|---|---|---|---|
| 2007/0156534 A1* | 7/2007 | Lerner et al. | 705/14 |
| 2013/0041826 A1* | 2/2013 | Lang et al. | 705/44 |
| 2013/0173460 A1* | 7/2013 | Lee et al. | 705/39 |
| 2013/0211919 A1* | 8/2013 | Doherty | 705/14.64 |

* cited by examiner

*Primary Examiner* — Ahshik Kim
(74) *Attorney, Agent, or Firm* — Polsinelli PC

(57) ABSTRACT

Various embodiments of the present technology involve the delivery of digital content via a synchronized content management system (CMS) in return for a payment. For example, a first user could send a share link containing a content item to a second user. Upon attempting to open the content item, the second user could be prompted to input payment information. In response to providing the payment information, the second user could select the share link enabling the second user to download the content item.

16 Claims, 8 Drawing Sheets

CONTENT ITEM DELIVERY FOR PAYMENT

TECHNICAL FIELD

The present technology pertains to content delivery, and more specifically pertains to enabling user to delivery content via a content management system in return for payment.

BACKGROUND

Content stored in an online storage account with synchronized content management system can be accessed on computing devices in a variety of ways, such as through a stand-alone application, one or more application plug-ins, a web browser, etc. Users can thus upload content items such as pictures, songs, documents, etc. from a computing device to their online storage account and later access the content items from different computing devices. A synchronized content management system can also facilitate the sharing of content between users. For example, a user can create a link to a content item that can be used to access the content item the user intends to share. The user can then provide the link to other uses to provide access to the content item. Therefore, such a synchronized content management system can facilitate the easy delivery of digital content from one individual user to another.

Instead of merely sharing digital content, some users may want to provide digital content for sale in return for a payment. Users are accustomed to shopping for and purchasing items online through electronic marketplaces, many of which enable individual users (i.e., third-party sellers) to sell items through their websites. In order to become a third-party sell, an individual user must, among other things, register with and run each transaction through the electronic marketplace, thereby, adding an additional layer to this process. This is not always convenient for the average person who may sell only a few items each month. Therefore, it could be advantageous to enable users storing digital content in a content management system to share their digital content in return for a payment.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for delivering digital content via a synchronized content management system in return for a payment. The content can include, for example, an E-book, photos, music, or service invoices, such as tax returns, commissioned digital artwork, and the like. For example, a first user could send a share link containing a content item to a second user. Upon attempting to open the content item by selecting the share link, the second user could be prompted to input payment information. In response to providing the payment information, the second user can then select the share link and download the content item.

In at least one embodiment, a content management system (CMS) receives a first request to share a content item for a payment. In order to facilitate the sharing function, the CMS generates a link corresponding to a path identifying the stored location of the content item in the CMS. Once the link is generated, the CMS sends the link to the user along with payment request information provided in the first request. In this example, a second request to access the content item via the link is received (i.e., the user has selected the link). In response, the user prompted to input payment information for accessing the content item. Upon receiving the payment information, the CMS can either authorized the payment or have payment authorization performed by a third-party. Accordingly, when the payment is authorized, the content item is made accessible to the user and can be stored to a folder associated with their user account at the CMS.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for delivering digital content via a synchronized content management system (CMS) in return for a payment. For example, the CMS can receive a request from a first user to share a content item for payment with a second user. In one example, the content item is sent to the CMS with the request or, alternatively, the content item could already reside with the CMS in a user account of the first user. In at least one embodiment, the first user can define what price they want to charge for the content item by providing information, such as the price and a desired location for the payment when received from the second user, into a price interface. In order to share the content item, the CMS can generate a link which essentially points to the location of the content item at the CMS and, when selected, enables the selecting user to open the content item.

Accordingly, in this example, the link is sent to the second user which, upon being selected, prompts the user for payment information before the content item can be viewed or downloaded. Once the second user's payment information is received, the payment information is processed. In one example, the CMS is able to process the payment information. Alternatively, the CMS can cause the payment information to be sent to a third-party payment facilitator, such as a bank, online payment provider, credit card company, or any other financial institution capable of processing payments. Accordingly, in response to the payment information being authorized, the content item is made accessible to the user on the computing device, such as by downloading the content item locally.

Various other functions and advantages are described and suggested below as may be provided in accordance with the various embodiments.

Figure 1A:
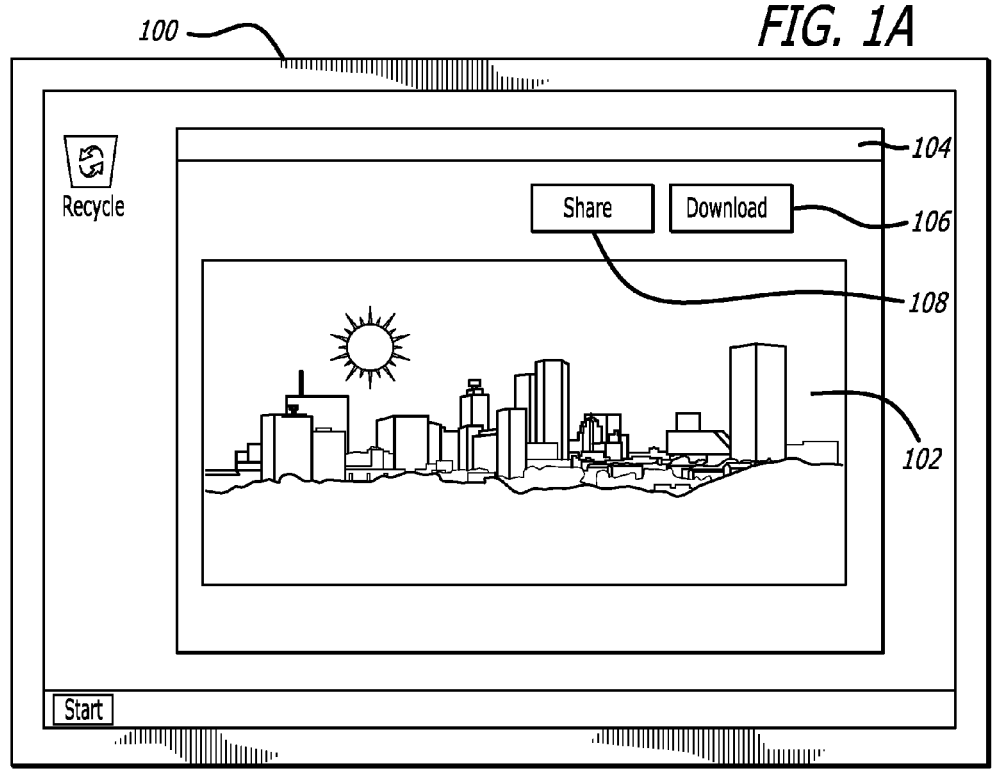
FIG. 1A shows an example screenshot of a content item that a user selects to share via a content management system in return for a payment in accordance with various embodiments.

Accordingly, FIGS. 1A-1D show such an example process where a content item 102 is shared via the CMS in accordance with various embodiments. FIG. 1A shows an example screenshot of computing device 100 displaying content item 102 which a first user would like to share with a second user in return for a payment in accordance with at least one embodiment. In this example, the first user is viewing content item 102 through webpage 104 provided by the CMS. For example, the first user can login to their account with the CMS via a web browser from any computer and view their content items. Alternatively, a client-side application associated with the CMS can be installed on computing device 100 and integrated into the device's file system. In other examples, the client-side application can be integrated through a webpage displayed using a web browser or may include CMS specific components that can be, for example, a stand-alone application, one or more application plug-ins, and/or a browser extension. However, the user can also interact with the CMS via a third-party application, such as a web browser, that resides on computing device 100 and is configured to communicate with the CMS. Since the first user is viewing content item 102 through webpage 104, the user can choose to locally download content item 102 by selecting 'Download' button 106.

In this example, the second user could have commissioned the first user as an independent contractor to capture content item 102, which is an image of a cityscape, for a personal webpage or the like. In one example, the transfer of digital content, such as images, graphic designer work product, articles, and the like, for payment from independent contractors typically requires two independent transactions (e.g., sending the file via email and sending payment via an online payment service, etc.) where the first party to transact must trust the second party to follow through with their end of the deal. Accordingly, there is a need for simplifying the transaction process and providing a more reliable means of ensuring each user follows through on their end of the deal when delivering digital content for payment.

Figure 1B:
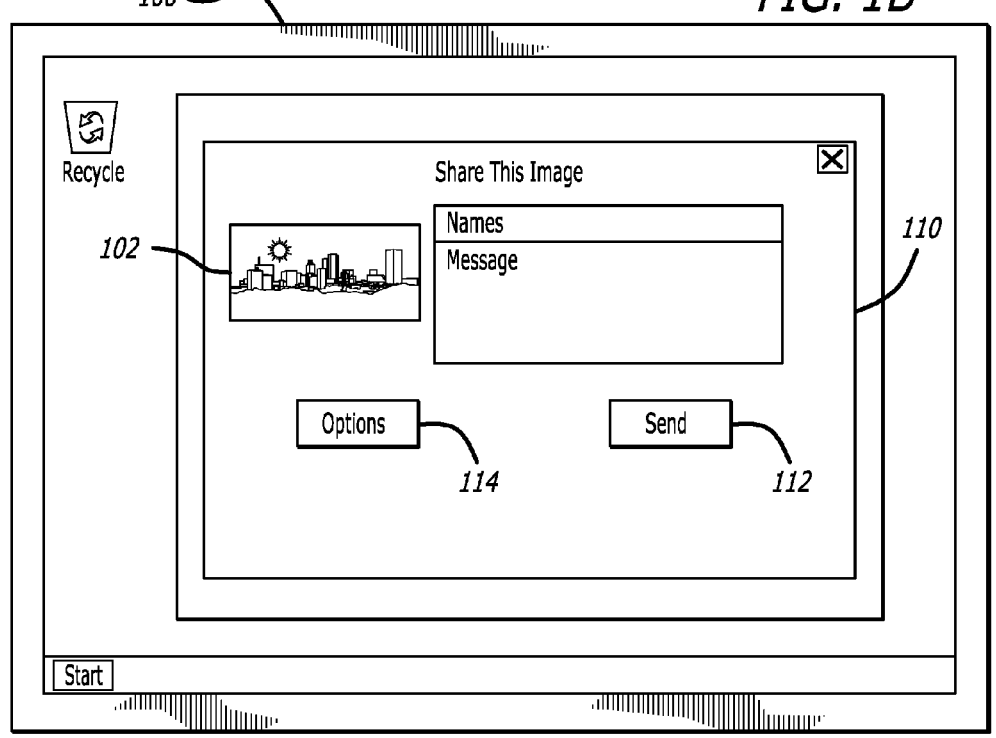
FIG. 1B shows another example screenshot wherein a share window is displayed to the user in accordance with various embodiments.

In order to simplify the transaction process and hold each party equally accountable to the transaction, the first user can choose to deliver content item 102 via the CMS by selecting 'Share' button 108 which will not enable the second user to access content item 102 until payment has been received. Accordingly, upon selecting 'Share' button 108, share user interface (UI) 110 for the first user to provide a recipients information is displayed, which is shown in FIG. 1B. In this example, share UI 110 includes recipient fields for the user to provide a recipient's information (e.g., email, user name, phone number, etc.), a message field in which the user can introduce content item 102 to the recipient, 'options' button 114 to select various content item options, and send button 112 to send content item 102.

Figure 1C:
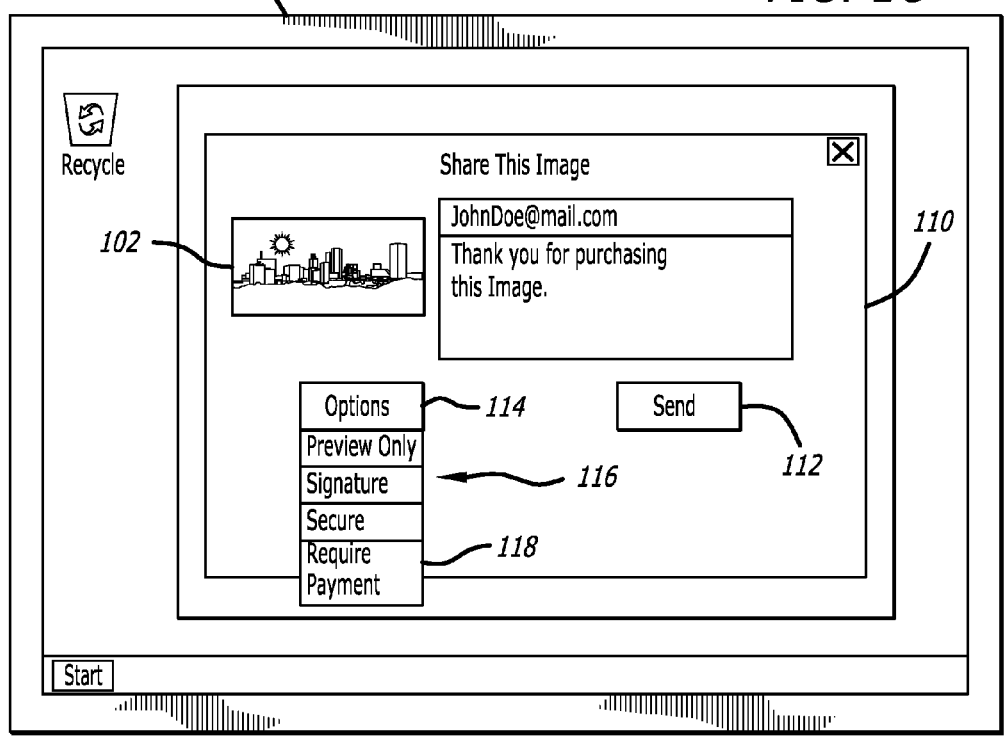
FIG. 1C shows another example screenshot wherein the user selects to share the content item for payment from among various sharing options in accordance with various embodiments.

Accordingly, FIG. 1C shows an example screenshot of share user interface (UI) 110 after 'options' button 114 has been selected in accordance with at least one embodiment. In this example, 'options' button 114 expands options dropdown 116 that includes a 'Preview Only' option enabling the user to share content item 102 without enabling the recipient to download content item 102, a 'Signature' option enabling the user to send content item 102 to the recipient in order to obtain the recipient's signature, a 'Secure' option enabling the user to password protect content item 102 or set a time after which content item 102 is no longer available for the recipient to view, and a 'Payment Required' option 118. Various other options can also be provided within the scope of various embodiments.

Figure 1D:
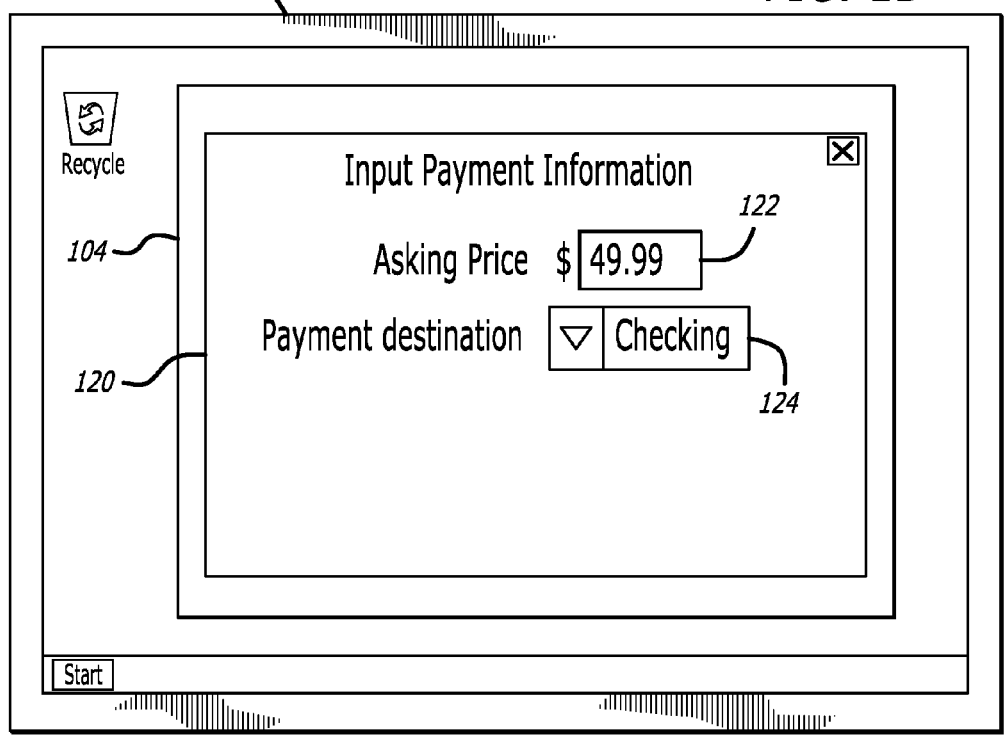
FIG. 1D shows another example screenshot wherein the user provides payment information to share the content item in accordance with various embodiments.

Accordingly, in this example, the first user has selected 'Payment Required' option 118 causing price interface (UI) 120 to be displayed, as shown in FIG. 1D. Price UI 120, in this example, enables the first user to provide asking price 122 for which they want to charge for content item 102 and payment destination dropdown 124 which includes one or more destinations (e.g., checking account, savings account, online payment service, etc.) for the payment once it is received from the second user. Once the first user has provided the price information for content item 102 via price UI 120 and the delivery information via share UI 110 and selected send button 118, content item 102 along with the price and delivery information can be sent to the CMS.

Figure 2:
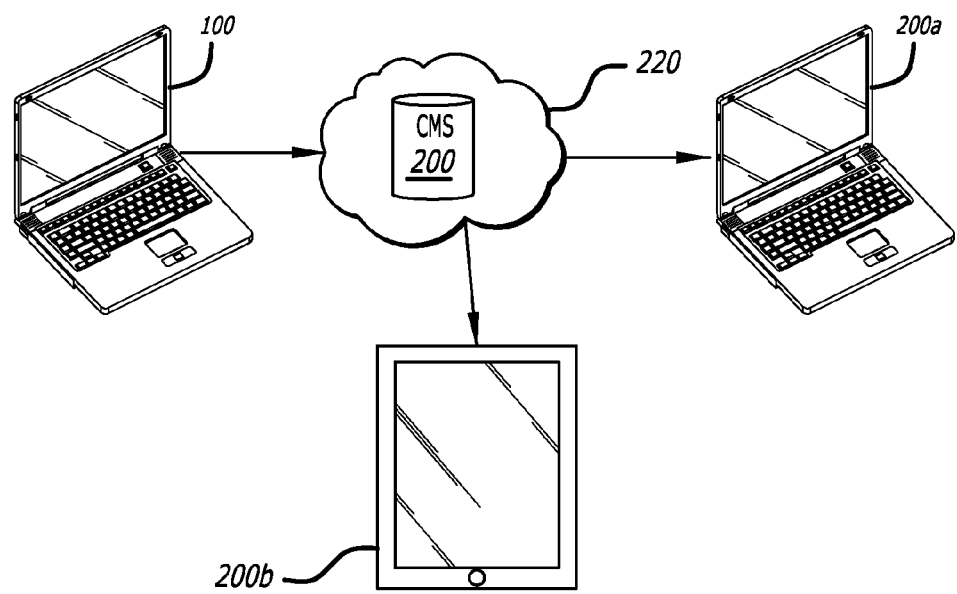
FIG. 2 shows an environment wherein the payment for delivering the content item from a first computing device to a second and third computing device is authorized by a content management system in accordance with various embodiments.

FIG. 2 shows an example environment where computing device 100 sends content item 102 through network 220 to CMS 200 in accordance with various embodiments. In order to enable the second user to access content item 102, CMS 200 can generate a sharing link that, when selected, retrieves content item 102 from its stored location in CMS 200. In one example, the sharing link is a custom network address, such as a uniform resource locator (URL), which allows content item 102 to be accessed from its stored location. CMS 200, therefore, can use the sharing link to identify content item 102 and return it to a requesting user device once payment is authorized.

In one example, CMS 200 can include a sharing index that lists each sharing link along with a content path identifying the location of a respective content item associated with a sharing link. CMS 200 can thus use the sharing link received from a requesting client device to search the sharing index and return the content item. A sharing link can be provided to a user in multiple ways. In some embodiments, the sharing link can be visually presented to the user. For example, the sharing link can be presented as text on the computing device that the user can copy to an e-mail, social networking post, etc., to share the content item. Alternatively, in some embodiments, the sharing link can be stored to a data buffer on a computing device, such as a clipboard. The user can thus access the sharing link by using, for example, a paste function to enter the sharing link into an e-mail, social networking post, etc.

Accordingly, the link is sent to the second user using the delivery information provided by the first user via share UI 110. In this example, CMS 200 is capable of processing and authorizing payment for the first user. Therefore, when CMS 200 sends the share link, the second user of computing device 200a is prompted to input payment information. Upon receiving the payment information from the second user, CMS 200 can process the second user's payment and either unlock activate the share link or, if the payment is declined, keep the link inactive until the second user provides a suitable means of payment.

Figure 3A:
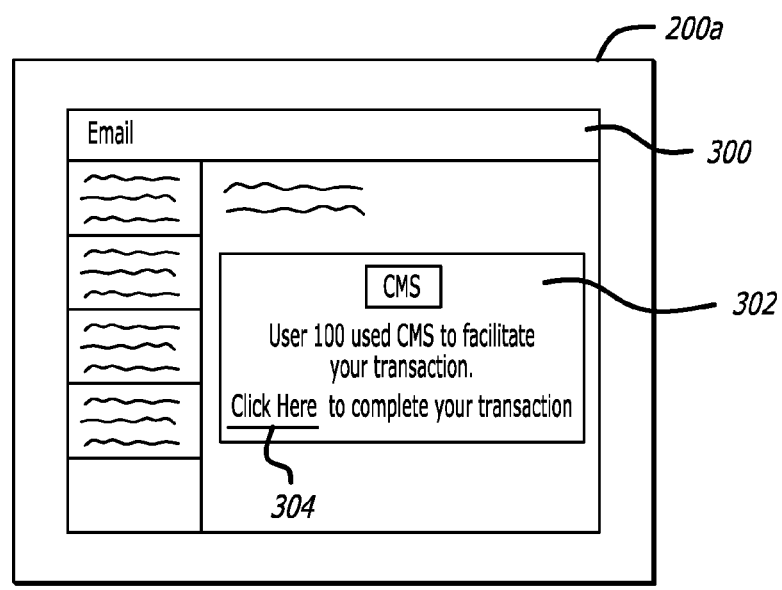
FIG. 3A shows an example screenshot of the second computing device wherein the content item is accessible by selecting a link sent via email in accordance with various embodiments.

FIG. 3A shows an example screenshot of computing device 200a where content item 102 has been sent via email 300 in accordance with various embodiments. In this example, the second user has opened an email generated by CMS 200 on computing device 200a which contains message 302 stating "User 100 used CMS to facilitate your transaction. Click Here to complete your transaction" where 'Click Here' is active link 304 that, when selected, prompts the second user of payment information.

Figure 3B:
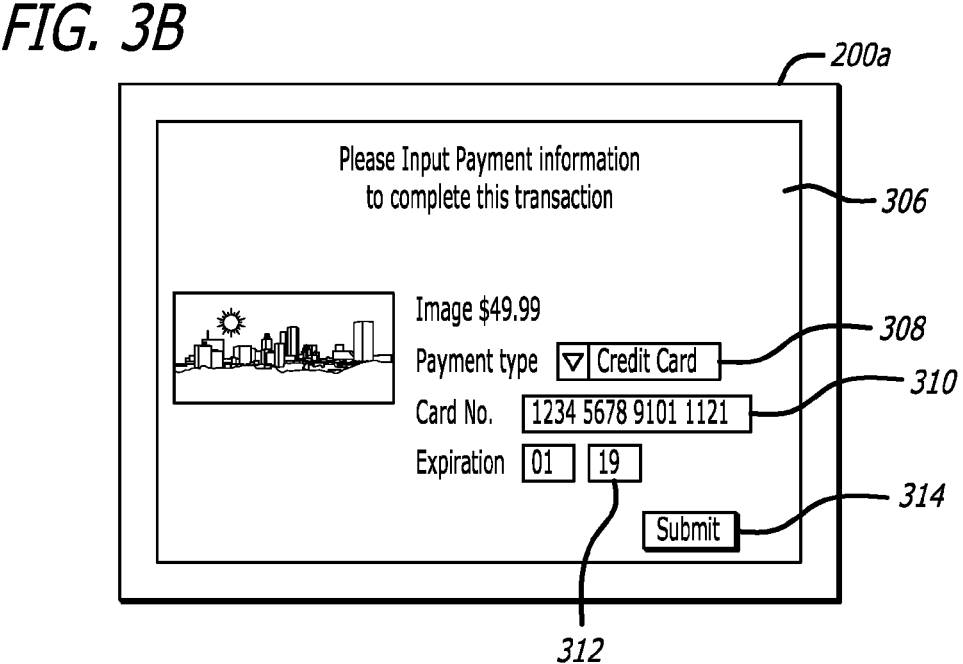
FIG. 3B shows an example screenshot of the second computing device wherein the link has been selected and a payment window displayed for the user to input payment information for receiving the content item in accordance with various embodiments.

FIG. 3B shows an example screenshot where computing device 200a is displaying payment interface (UI) 306 in accordance with various embodiments. In this example, active link 304 has been selected and payment UI 306 has been displayed to prompt the second user for payment before enabling them to download content item 102. Accordingly, second user, in this example, selects payment type 308 as credit card, inputs their card number in card number field 310, inputs their card's expiration date into expiration date field 312, and selects the 'Submit' button 314 to cause their payment to be processed and their card to be charged.

Figure 3C:
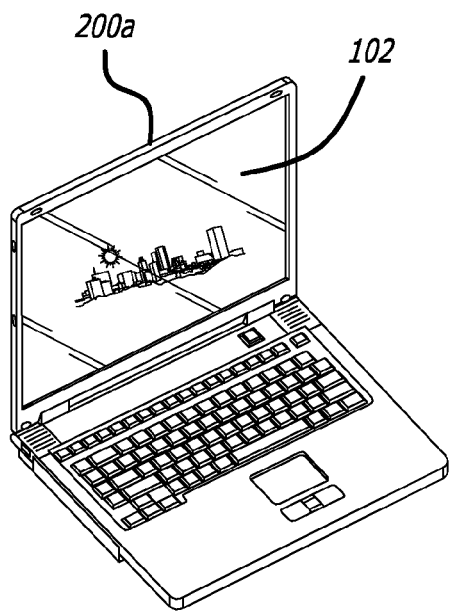
FIG. 3C shows an example screenshot of the second computing device wherein the payment has been authorized, the content item has been received, and the content item is displayed on the second computing device in accordance with various embodiments.
Figure 3D:
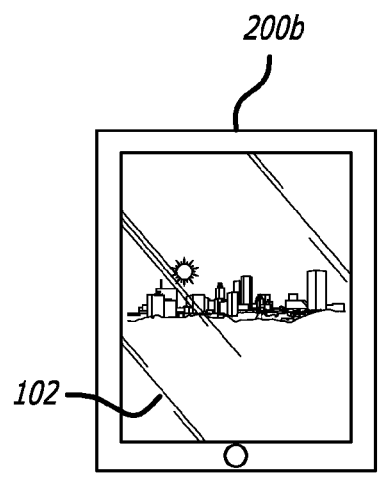
FIG. 3D shows an example screenshot of the third computing device wherein the user's account with the content management system has been synchronized across each of the user's devices and the content item is displayed on the third computing device in accordance with various embodiments.

Accordingly, if the user's payment is declined, the link will remain inactive and they will be prompted to provide an alternate means of payment. If, however, the payment goes through, the link will become active, thereby, enabling the second user to download content item 102 on computing device 200a, as shown in FIG. 3C where the cityscape image (i.e., content item 102) is shown displayed on computing device 200a. In this example, computing device 200a is a laptop computer that includes a client-side application that communicates with CMS 200 to synchronize a copy of content items stored locally on each computing device (200a, 200b) with copy of those content item stored with CMS 200. In this example, the client-side application could include a folder containing each of a user's content items that is synchronized with CMS 200 when a new content item is added to the folder or an existing content item is modified. Thus, when the second user's payment is authorized via computing device 200a, content item 102 is downloaded, and stored in the second user's account, CMS 200 will synchronize the user's account across all the second user's devices and store a copy of content item 102 locally on computing device 200b, as shown in FIG. 3D, which is a tablet computer.

Figure 4:
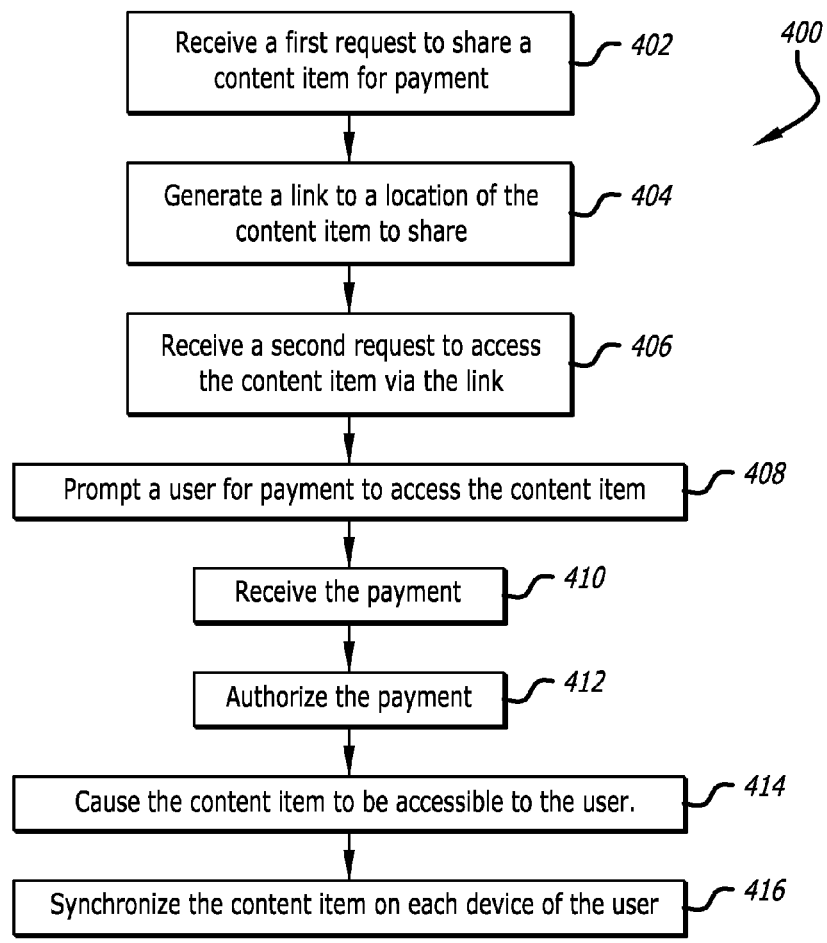
FIG. 4 shows an exemplary process for sharing a content item via a content management system for payment in accordance with at least one embodiment.

FIG. 4 shows an exemplary process 400 for sharing a content item via a content management system for payment in accordance with at least one embodiment. It should be understood that, for this and other processes discussed herein, there can be additional, fewer, or alternative steps, performed in similar or alternative orders, or in parallel, within the scope of the various embodiments unless otherwise stated. In this example, a first request to share a content item for payment is received from a first user 402. In response to receiving the request, a link to a location of the content item is generated 404. Once the link is generated and sent to a second user, a second request form the second user to access the content item via the link is received 406.

In this example, the second user is prompted for payment in order to access the content item 408. In this example, the second user inputs and provides their payment information which is received by the content management system 410. Accordingly, in this example, the content management system authorizes the payment 412. In response to authorizing the payment, the content management system causes the content item to be accessible to the second user 414. Accordingly, the content management system also provides the first user with the payment for the content item. In this example, the content item is stored in a folder associated with the second user's account with the content management system, which synchronizes the content item on each device of the user 416.

Figure 5:
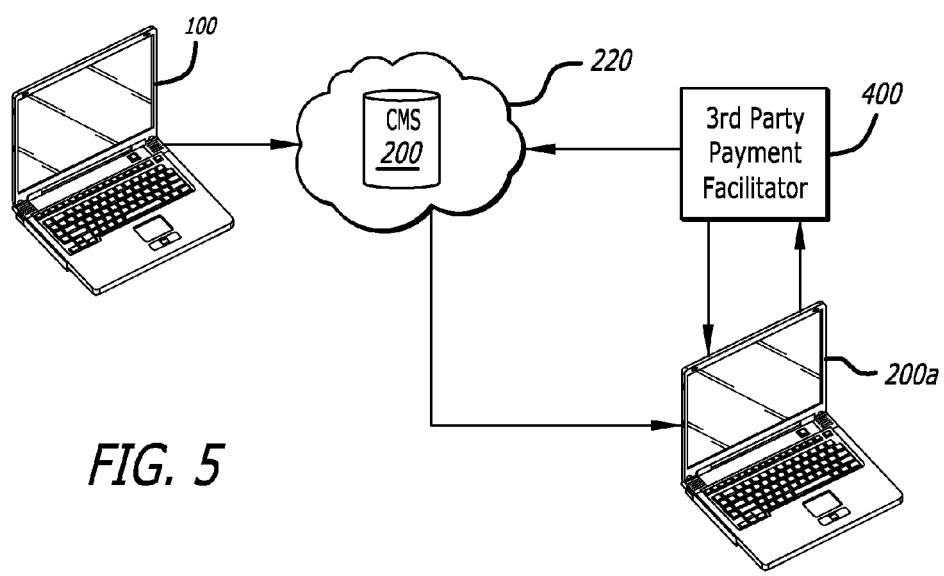
FIG. 5 shows an environment wherein the payment for delivering the content item from a first computing device to a second and third computing device is authorized by a third-party payment facilitator in accordance with various embodiments.

FIG. 5 shows another example environment where, instead of CMS 200 being capable of processing the payment for the first user, CMS 200 sends the payment information to third-party payment facilitator 500 to process the payment in accordance with various embodiments. In this example, CMS 200 is either not capable of processing the payment or prefers, in this instance, to send the payment information to third-party payment facilitator 500. Accordingly, in this example, computing device 100 initially sends content item 102, along with the delivery and price information, to CMS 200. CMS 200 generates the sharing link and sends the sharing link to computing device 200a. In this example, once the second user selects the 'Submit' button 314 to cause their payment to be processed and their card to be charged, the payment information is sent, not back to CMS 200 for processing as in the previous example, but to third-party payment facilitator 400. In one example, payment information could be sent from computing device 200a to CMS 200 who then forwards the payment information to third-party payment facilitator 500. If the payment is authorized, third-party payment facilitator 500 could send a signal back to CMS 200 to activate the link to enable the second user to download content item 102. Various other configurations and authorization order are also possible within the scope of various embodiments.

Figure 6:
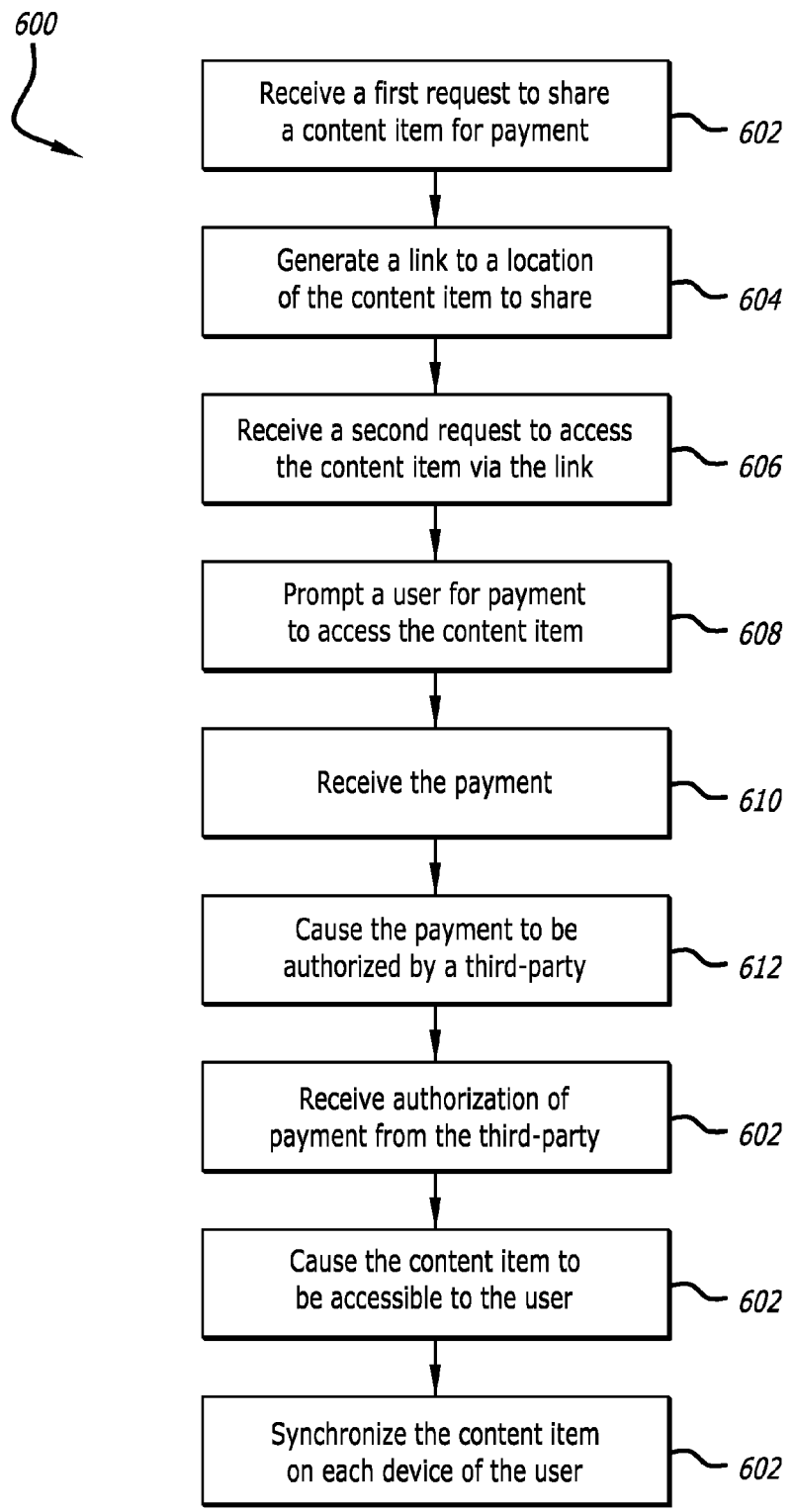
FIG. 6 shows an exemplary process for sharing a content item via a content management system for payment in accordance with at least one embodiment.

FIG. 6 shows an exemplary process 600 where the payment for delivering a content item from a first computing device to a second and third computing device is authorized by a third-party payment facilitator in accordance with at least one embodiment. In this example, a first request to share a content item for payment is received from a first user 602. In response to receiving the request, a link to a location of the content item is generated 604. Once the link is generated and sent to a second user, a second request form the second user to access the content item via the link is received 606.

In this example, the second user is prompted for payment in order to access the content item 608. In this example, the second user inputs and provides their payment information which is received by the content management system 610. Accordingly, in this example, the content management system causes the payment to be authorized by a third-party, such as a bank, credit card company, or online payment service 612. In response to receiving authorization from the third-party, the content management system causes the content item to be accessible to the second user 614. Accordingly, the content management system also provides the first user with the payment for the content item. In this example, the content item is stored in a folder associated with the second user's account with the content management system, which synchronizes the content item on each device of the user 616.

Figure 7:
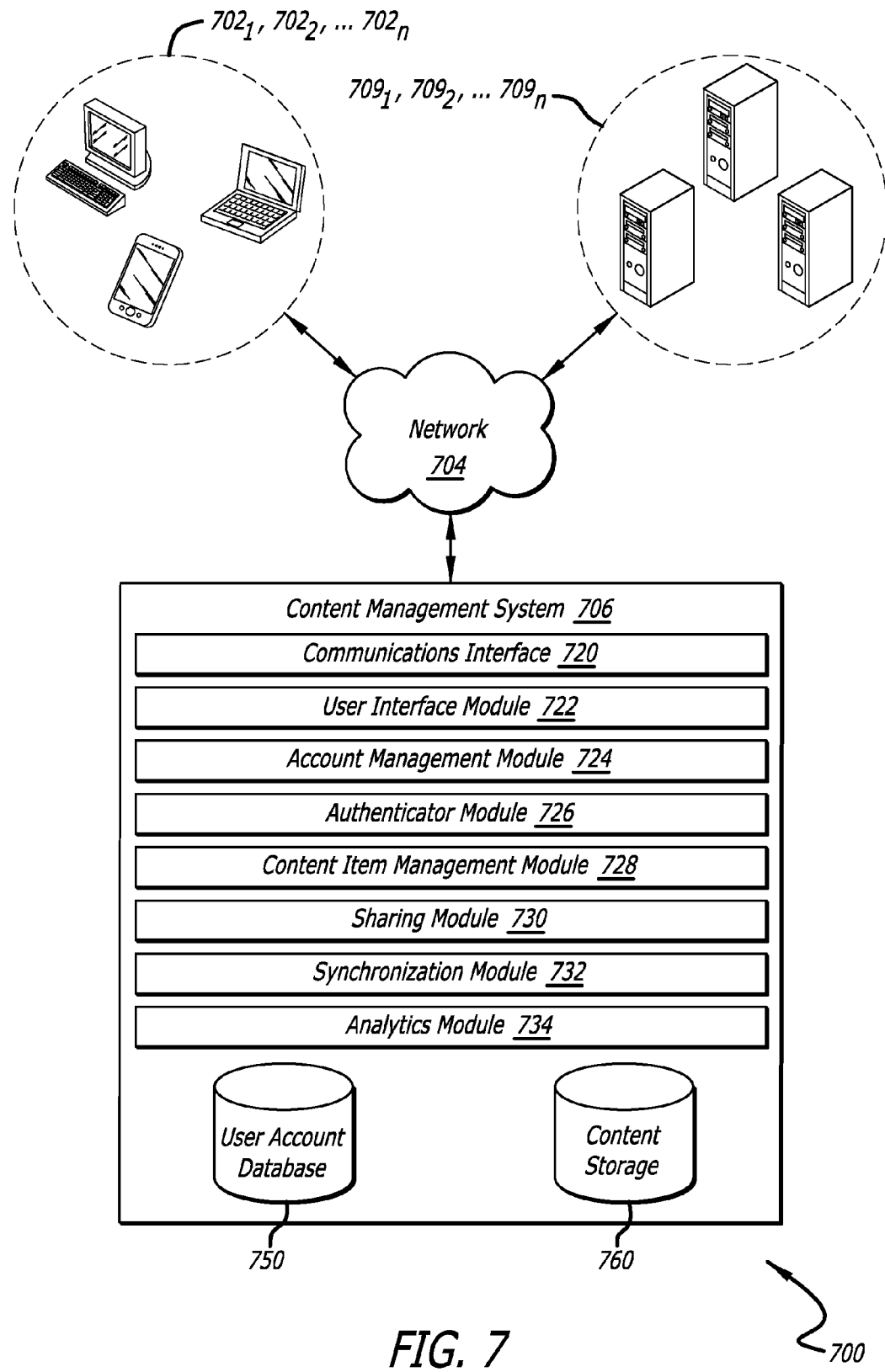
FIG. 7 shows an exemplary configuration of devices and a network in accordance with the invention.

An exemplary system configuration 700 for enabling access to content of a compressed content item from a variety of computing devices is shown in FIG. 7, wherein computing devices communicate via a network for purposes of exchanging content and other data. The system can be configured for use on a wide area network such as that illustrated in FIG. 7. However, the present principles are applicable to a wide variety of network configurations that facilitate the intercommunication of electronic devices. For example, each of the components of system 700 in FIG. 7 can be implemented in a localized or distributed fashion in a network.

In system 700, a user can interact with content management system 706 through computing devices $702_1$, $702_2$, ..., $702_n$ (collectively "602") connected to network 704 by direct and/or indirect communication. Content management system 706 can support connections from a variety of different computing devices, such as desktop computers; mobile computers; mobile communications devices, e.g. mobile phones, smart phones, tablets; smart televisions; set-top boxes; and/or any other network enabled computing devices. Computing devices 702 can be of varying type, capabilities, operating systems, etc. Furthermore, content management system 706 can concurrently accept connections from and interact with multiple computing devices 702.

A user can interact with content management system 706 via a client-side application installed on computing device $702_i$. In some embodiments, the client-side application can include a content management system specific component. For example, the component can be a stand-alone application, one or more application plug-ins, and/or a browser extension. However, the user can also interact with content management system 706 via a third-party application, such as a web browser, that resides on computing device $702_i$ and is configured to communicate with content management system 706. In either case, the client-side application can present a user interface (UI) for the user to interact with content management system 706. For example, the user can interact with the content management system 706 via a client-side application integrated with the file system or via a webpage displayed using a web browser application.

Content management system 706 can make it possible for a user to store content, as well as perform a variety of content management tasks, such as retrieve, modify, browse, and/or share the content. Furthermore, content management system 706 can make it possible for a user to access the content from multiple computing devices 702. For example, computing device $702_i$ can upload content to content management system 706 via network 704. The content can later be retrieved from content management system 706 using the same computing device $702_i$ or some other computing device $702_j$.

To facilitate the various content management services, a user can create an account with content management system 706. The account information can be maintained in user account database 750. User account database 750 can store profile information for registered users. In some cases, the only personal information in the user profile can be a username and/or email address. However, content management system 706 can also be configured to accept additional user information.

User account database 750 can also include account management information, such as account type, e.g. free or paid; usage information, e.g. file edit history; maximum storage space authorized; storage space used; content storage locations; security settings; personal configuration settings; content sharing data; etc. Account management module 724 can be configured to update and/or obtain user account details in user account database 750. The account management module 724 can be configured to interact with any number of other modules in content management system 706.

An account can be used to store content, such as digital data, documents, text files, audio files, video files, etc., from one or more computing devices 702 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 760. Content storage 760 can be a storage device, multiple storage devices, or a server. Alternatively, content storage 760 can be a cloud storage provider or network storage accessible via one or more communications networks. Content management system 706 can hide the complexity and details from computing devices 702 so that computing devices 702 do not need to know exactly where the content items are being stored by content management system 706. In one variation, content management system 706 can store the content items in the same folder hierarchy as they appear on computing device $702_i$. However, content management system 706 can store the content items in its own order, arrangement, or hierarchy. Content management system 706 can store the content items in a network accessible storage (SAN) device, in a redundant array of inexpensive disks (RAID), etc. Content storage 760 can store content items using one or more partition types, such as FAT, FAT32, NTFS, EXT2, EXT3, EXT4, ReiserFS, BTRFS, and so forth.

Content storage 760 can also store metadata describing content items, content item types, and the relationship of content items to various accounts, folders, or groups. The metadata for a content item can be stored as part of the content item or can be stored separately. In one variation, each content item stored in content storage 760 can be assigned a system-wide unique identifier.

Content storage 760 can decrease the amount of storage space required by identifying duplicate files or duplicate segments of files. Instead of storing multiple copies, content storage 760 can store a single copy and then use a pointer or other mechanism to link the duplicates to the single copy. Similarly, content storage 760 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 706 can be configured to support automatic synchronization of content from one or more computing devices 702. The synchronization can be platform agnostic. That is, the content can be synchronized across multiple computing devices 702 of varying type, capabilities, operating systems, etc. For example, computing device $702_i$ can include client software, which synchronizes, via a synchronization module 732 at content management system 706, content in computing device $702_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 706. Conversely, the background process can identify content that has been updated at content management system 706 and synchronize those changes to the local folder. The client software can provide notifications of synchronization operations, and can provide indications of content statuses directly within the content management application. Sometimes computing device $702_i$ may not have a network connection available. In this scenario, the client software can monitor the linked folder for file changes and queue those changes for later synchronization to content management system 706 when a network connection is available. Similarly, a user can manually stop or pause synchronization with content management system 706.

A user can also view or manipulate content via a web interface generated and served by user interface module 722. For example, the user can navigate in a web browser to a web address provided by content management system 706. Changes or updates to content in the content storage 760 made through the web interface, such as uploading a new version of a file, can be propagated back to other computing devices 702 associated with the user's account. For example, multiple computing devices 702, each with their own client software, can be associated with a single account and files in the account can be synchronized between each of the multiple computing devices 702.

Content management system 706 can include a communications interface 720 for interfacing with various computing devices 702, and can interact with other content and/or service providers $709_1, 709_2, \ldots, 709_n$ (collectively "709") via an Application Programming Interface (API). Certain software applications can access content storage 760 via an API on behalf of a user. For example, a software package, such as an app on a smartphone or tablet computing device, can programmatically make calls directly to content management system 706, when a user provides credentials, to read, write, create, delete, share, or otherwise manipulate content. Similarly, the API can allow users to access all or part of content storage 760 through a web site.

Content management system 706 can also include authenticator module 726, which can verify user credentials, security tokens, API calls, specific computing devices, and so forth, to ensure only authorized clients and users can access files. Further, content management system 706 can include analytics module 734 module that can track and report on aggregate file operations, user actions, network usage, total storage space used, as well as other technology, usage, or business metrics. A privacy and/or security policy can prevent unauthorized access to user data stored with content management system 706.

Content management system 706 can include sharing module 730 for managing sharing content publicly or privately. Sharing content publicly can include making the content item accessible from any computing device in network communication with content management system 706. Sharing content privately can include linking a content item in content storage 760 with two or more user accounts so that each user account has access to the content item. The sharing can be performed in a platform agnostic manner. That is, the content can be shared across multiple computing devices 702 of varying type, capabilities, operating systems, etc. The content can also be shared across varying types of user accounts.

In some embodiments, content management system 706 can include a content item management module 728 for maintaining a content directory. The content directory can identify the location of each content item in content storage 760. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 706 can use the content path to present the content items in the appropriate folder hierarchy.

A content entry can also include a content pointer that identifies the location of the content item in content storage 760. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 730 can be configured to add a user account identifier to the content entry associated with the content item, thus granting the added user account access to the content item. Sharing module 730 can also be configured to remove user account identifiers from a content entry to restrict a user account's access to the content item.

To share content publicly, sharing module 730 can be configured to generate a custom network address, such as a uniform resource locator (URL), which allows any web browser to access the content in content management system 706 without any authentication. To accomplish this, sharing module 730 can be configured to include content identification data in the generated URL, which can later be used to properly identify and return the requested content item. For example, sharing module 730 can be configured to include the user account identifier and the content path in the generated URL. Upon selection of the URL, the content identification data included in the URL can be transmitted to content management system 706 which can use the received content identification data to identify the appropriate content entry and return the content item associated with the content entry.

In addition to generating the URL, sharing module 730 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 730 can be configured to change the value of the flag to 7 or true after generating a URL to the content item.

In some embodiments, sharing module 730 can also be configured to deactivate a generated URL. For example, each content entry can also include a URL active flag indicating whether the content should be returned in response to a request from the generated URL. For example, sharing module 730 can be configured to only return a content item requested by a generated link if the URL active flag is set to 7 or true. Thus, access to a content item for which a URL has been generated can be easily restricted by changing the value of the URL active flag. This allows a user to restrict access to the shared content item without having to move the content item or delete the generated URL. Likewise, sharing module 730 can reactivate the URL by again changing the value of the URL active flag to 7 or true. A user can thus easily restore access to the content item without the need to generate a new URL.

While content management system 706 is presented with specific components, it should be understood by one skilled in the art, that the architectural configuration of system 706 is simply one possible configuration and that other configurations with more or less components are also possible.

Figures 8A, 8B:
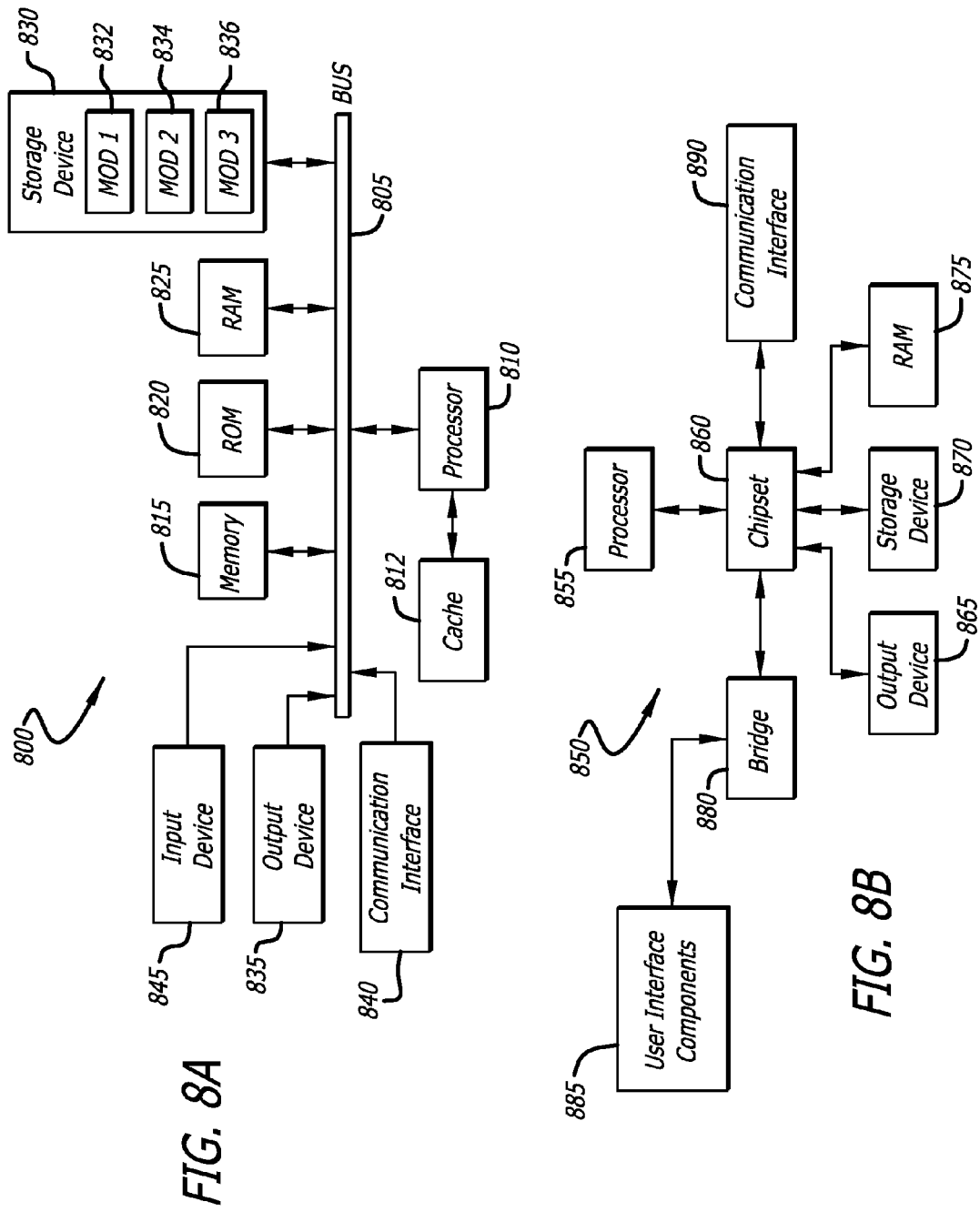
FIG. 8A shows a conventional system bus computing system architecture.
FIG. 8B shows a computer system having a chipset architecture.

FIG. 8A, and FIG. 8B show exemplary possible system embodiments. The more appropriate embodiment will be apparent to those of ordinary skill in the art when practicing the present technology. Persons of ordinary skill in the art will also readily appreciate that other system embodiments are possible.

FIG. 8A shows a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B shows a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 850 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   receiving, by a content management system, a request from a first user to share a content item for payment with a second user;
   generating a link to share the content item with the second user, the link being associated with a path identifying a location of the content item at the content management system;
   sending the link to the second user, the link, upon being selected, prompting the user for payment information;
   causing the payment information to be processed;
   causing, in response to the payment information being authorized, the content item to be accessible to the second user on a computing device;
   receiving, from the second user, a request to store the content item in a folder of a user account at the content management system;
   storing the content item in the folder of the user account; and
   synchronizing a corresponding folder associated with the user account of the second user on at least one second computing device by locally storing a copy of the content item on the at least one second computing device.

2. The computer-implemented method of claim 1, wherein causing the payment to be processed includes:
   causing the payment information to be sent to a third-party payment facilitator to authorize the payment information.

3. The computer-implemented method of claim 2, further comprising:
   receiving payment authorization from the third-party payment facilitator; and
   causing the link to be activated to enable the computing device to download the content item.

4. The computer-implemented method of claim 1, wherein causing the payment to be processed includes:
   processing, by the content management system, the payment information; and sending, in response to the payment information being authorized, a signal to the computing device causing the content item to be accessible to the second user.

5. The computer-implemented method of claim 1, wherein the content item is at least one of sent to the content management system with the request or previously stored with the content management system and associated with a user account of the first user.

6. A content management system, comprising:
at least one processor; and
memory including instructions that, when executed by the at least one processor, cause the content management system to:
receive, from a first user, a request to share a content item with a second user in return for a payment;
cause a price interface to be provided to the first user, the price interface including one or more fields enabling the first user to define a price for the content item;
generate a link associated with a location of the content item in the content management system;
send the link to the second user, the second user being unable to access the content item until the payment is receive;
receive, from the second user, a request to store the content item in a folder of a user account at the content management system;
store the content item in the folder of the user account; and
synchronize a corresponding folder associated with the user account of the second user on at least one second computing device by locally storing a copy of the content item on the at least one second computing device.

7. The content management system of claim 6, wherein the instructions that, when executed by the processor, further cause the computing system to:
receive, from a computing device of the second user, selection of the link;
cause a prompt to be displayed to the second user, the prompt including one or more fields for the user to provide payment information to access the content item; and
cause, upon receiving the payment information, the payment information to be processed.

8. The content management system of claim 7, wherein the instructions that, when executed by the processor, further cause the computing system to:
if the payment information is declined,
prompt the second user for an alternative means of payment; and
if the payment information is authorized, enable access to the content item.

9. The content management system of claim 6, wherein the content item is at least one of sent to the content management system with the request or previously stored with the content management system and associated with a user account of the first user.

10. The content management system of claim 7, wherein causing the payment to be processed includes:
causing the payment information to be sent to a third-party payment facilitator to authorize the payment information.

11. The content management system of claim 7, wherein causing the payment to be processed includes:
processing, by the content management system, the payment information; and
sending, in response to the payment information being authorized, a signal to the computing device causing the content item to be accessible to the user.

12. The content management system of claim 6, wherein the link is a custom network address sent to the second user by at least one of an email, a text message, or a social networking post.

13. The content management system of claim 7, wherein communication with the computing device is provided through at least one of a native client application installed on the computing device or a plugin through at least one of a web browser or file system.

14. A non-transitory computer-readable storage medium storing instructions that, when executed by at least one processor, cause a computing device to:
receive, by a computing device of a first user, selection of a share link to access a content item, the share link being associated with a path identifying a location of the content item at a content management system;
display a prompt to the first user, the prompt including one or more fields for the user to provide payment information to access the content item;
send, upon receiving the payment information into the one or more fields, the payment information to be processed;
download, by the computing device, the content item from the content management system in response to the payment information being authorized;
send a request to store the content item in a folder of a user account at a content management system;
store the content item in the folder of the user account; and
synchronize a corresponding folder associated with the user account of the first user on at least one second computing device by locally storing a copy of the content item on the at least one second computing device.

15. The non-transitory computer-readable storage medium of claim 14, wherein the share link is a custom network address generated by a content management system and sent to the first user by at least one of an email, a text message, or a social networking post.

16. The non-transitory computer-readable storage medium of claim 14, wherein communication with a content management system is provided through at least one of a native client application installed on the computing device or a plugin through at least one of a web browser or file system.

* * * * *